US011363035B2

(12) United States Patent
Rayapeta et al.

(10) Patent No.: US 11,363,035 B2
(45) Date of Patent: Jun. 14, 2022

(54) CONFIGURABLE ROBUSTNESS AGENT IN A PLANT SECURITY SYSTEM

(71) Applicant: FISHER-ROSEMOUNT SYSTEMS, INC., Round Rock, TX (US)

(72) Inventors: Vinaya S. Rayapeta, Cedar Park, TX (US); Jacob B. Peschansky, Austin, TX (US); William E. Bennett, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 859 days.

(21) Appl. No.: 14/719,946

(22) Filed: May 22, 2015

(65) Prior Publication Data

US 2016/0344754 A1 Nov. 24, 2016

(51) Int. Cl.
*H04L 67/12* (2022.01)
*H04L 9/40* (2022.01)

(52) U.S. Cl.
CPC ...... *H04L 63/1416* (2013.01); *H04L 63/0227* (2013.01); *H04L 63/145* (2013.01); *H04L 67/12* (2013.01)

(58) Field of Classification Search
CPC . H04L 63/1416; H04L 63/0227; H04L 67/12; H04L 63/145

(Continued)

(56) References Cited

U.S. PATENT DOCUMENTS

| 7,548,544 | B2 | 6/2009 | Quinlan et al. |
| 7,774,834 | B1 * | 8/2010 | Chauhan ............ H04L 63/0236 726/12 |

(Continued)

FOREIGN PATENT DOCUMENTS

| CN | 101288060 A | 10/2008 |
| CN | 101495969 A | 7/2009 |

(Continued)

OTHER PUBLICATIONS

Search Report for Application No. GB1608102.8, dated Dec. 20, 2016.

(Continued)

*Primary Examiner* — Mohammad W Reza
(74) *Attorney, Agent, or Firm* — Marshall, Gerstein & Borun LLP (57) ABSTRACT

A communications network security system includes a robustness agent that operates within a communications interface of a device at one or more nodes of the network to analyze and filter messages coming from or going onto the network. At each of the nodes, the robustness agent determines one or more sets of message characteristics associated with each of the messages passing through the agent, and the agent is configured to allow certain types of messages (e.g., messages with certain predetermined sets of characteristics) to be passed through the agent, prevent messages with other predetermined characteristics from being passed through the agent, such as by halting (discarding or filtering) these messages, and/or passes still other messages having other sets of message characteristics to a volume filter to be counted. The volume filter counts the number of messages with a particular set of message characteristics and passes these messages if the number of these detected messages over a particular period of time is less than a particular threshold, and filters these messages if the number of counted messages is greater than a particular threshold over a particular period of time.

44 Claims, 3 Drawing Sheets

(58) Field of Classification Search
USPC .......................................................... 713/156
See application file for complete search history.

(56) References Cited

U.S. PATENT DOCUMENTS

| | | | |
|---|---|---|---|
| 8,224,902 B1* | 7/2012 | Glasser ................... | H04L 51/12 709/206 |
| 2002/0107953 A1 | 8/2002 | Ontiveros et al. | |
| 2005/0193073 A1* | 9/2005 | Mehr ...................... | H04L 51/12 709/206 |
| 2006/0010318 A1 | 1/2006 | Coley et al. | |
| 2007/0282952 A1* | 12/2007 | Lund .................... | G06Q 10/107 709/206 |
| 2007/0294765 A1 | 12/2007 | Rihn et al. | |
| 2008/0155693 A1* | 6/2008 | Mikan .................... | H04L 51/12 726/23 |
| 2009/0177750 A1* | 7/2009 | Lee ...................... | G06Q 10/107 709/206 |
| 2010/0017869 A1* | 1/2010 | Chauhan ............. | H04L 63/0263 726/13 |
| 2010/0132029 A1* | 5/2010 | Chauhan ............... | H04L 63/029 726/12 |
| 2011/0055332 A1* | 3/2011 | Stein ................. | G06F 17/30675 709/206 |
| 2011/0113107 A1* | 5/2011 | Hartwich .......... | H04L 12/40032 709/206 |
| 2012/0216274 A1* | 8/2012 | Chauhan ............. | H04L 63/0263 726/13 |
| 2015/0007314 A1 | 1/2015 | Vaughan | |
| 2015/0312186 A1* | 10/2015 | Giura ...................... | H04L 51/12 709/206 |

FOREIGN PATENT DOCUMENTS

| | | |
|---|---|---|
| CN | 102317876 A | 1/2012 |
| JP | 2004-185622 A | 7/2004 |
| JP | 2005-229573 A | 8/2005 |
| JP | 2006-60306 A | 3/2006 |
| JP | 2008-278357 A | 11/2008 |
| JP | 2014-123996 A | 7/2014 |
| JP | 2014-519113 A | 8/2014 |

OTHER PUBLICATIONS

Examination Report for Application No. GB1608102.8, dated Jun. 9, 2021.
Examination Report for Application No. GB1608102.8, dated Oct. 26, 2021.
Notice of Reasons for Rejection for Japanese Application No. 2016-102096, dated Feb. 8, 2021.
Notice of Reasons for Rejection for Japanese Application No. 2016-102096, dated Mar. 23, 2020.
Notification of First Office Action for Chinese Application No. 201610339856.0, dated Jun. 22, 2020.
Notification of Second Office Action for Chinese Application No. 201610339856.0, dated Mar. 1, 2021.
Notification of Third Office Action for Chinese Application No. 201610339856.0, dated Aug. 5, 2021.
Oda, "Realization of Router Setting more Securely by Packet Filtering; Blocking Unnecessary Packets," Nikkei Internet Solutions No. 65, Nikkei Business Publications, Inc., pp. 124-131 (2002).
Takagi, "Implementation and Evaluation of Packet Selection Processor Based on Packet Quantity and Contents," IEICE Technical Report, 104(659):65-70 (2005).
Watanabe, "Monitoring and Maintenance System for IT-Developed Design Equipment," Fuji Review, Fuji Electric Co., pp. 429-433 (2003).
Notification of Allowance for Chinese Application No. 201610339856.0, dated Dec. 22, 2021.

* cited by examiner

CONFIGURABLE ROBUSTNESS AGENT IN A PLANT SECURITY SYSTEM

FIELD OF TECHNOLOGY

This application relates generally to process or industrial plant communications systems and, more particularly, to detecting intrusions into control and maintenance communications networks, such as those used in process and industrial control systems, based on traffic detection and filtering within the plant communications networks.

DESCRIPTION OF THE RELATED ART

Process or industrial control and maintenance systems, such as distributed or scalable process control systems like those used in power generation, chemical, petroleum, or other manufacturing processes, typically include one or more controllers communicatively coupled to each other, to at least one host or operator workstation via a process control network and to one or more field devices via analog, digital or combined analog/digital buses. The field devices, which may be, for example valves, valve positioners, switches and transmitters (e.g., temperature, pressure and flow rate sensors), perform functions within the process or plant such as opening or closing valves, switching devices on and off and measuring process parameters. The controllers receive signals indicative of process or plant measurements made by the field devices and/or other information pertaining to the field devices, use this information to implement one or more control routines, and then generate control signals which are sent over the buses or communication channels of the plant network to the field devices to control the operation of the process or plant. Information from the field devices and the controller is typically made available, via the communications network, to one or more applications executed by the operator workstation to enable an operator or maintenance person to perform any desired function with respect to the process or plant, such as viewing the current state of the plant, modifying the operation of the plant, calibrating devices, detecting faulty devices, etc.

During operation, the process controllers, which are typically located within the process plant environment, are configured according to a configuration scheme to periodically or regularly receive signals indicative of process measurements or process variables made by or associated with the field devices and/or other information pertaining to the field devices, and execute controller applications using this information. The controller applications implement, for example, different control modules that make process control decisions, generate control signals based on the received information, and coordinate with the control modules or blocks in the field devices such as HART® and FOUNDATION® Fieldbus field devices. Further, the control modules in the process controllers send the control signals over the communication lines or other signal paths to the field devices, again according to a configuration scheme, to thereby control the operation of the process.

Information from the field devices and the process controllers is typically also made available to one or more other hardware devices within or external to the plant, such as, for example, operator workstations, maintenance workstations, servers, personal computers, handheld devices, data or event historians, report generators, centralized databases, etc., via one or more secured process control or maintenance networks. The information communicated over the process control or maintenance communications networks enables an operator or a maintenance person to perform desired functions with respect to the process and/or to view the operation of the plant or devices within the plant. For example, the control information allows an operator to change settings of process control routines, to modify the operation of the control modules within the process controllers or the smart field devices, to view the current state of the process or status of particular devices within the process plant, to view alarms and/or alerts generated by field devices and process controllers, to simulate the operation of the process for the purpose of training personnel or testing the process control software, to diagnose problems or hardware failures within the process plant, etc.

The field devices and controllers usually communicate with the other hardware devices over one or more secured process control or maintenance communications networks which may be, for example, implemented as Ethernet-configured LANs. The process control or maintenance communications network sends the process parameters, network information, and other process control data through various network devices and to various entities in the process control system. Typical network devices include network interface cards, network switches, routers, servers, firewalls, controllers, operator workstations, and databases. The network devices typically facilitate the flow of data through the network by controlling routing, frame rate, timeout, and other network parameters, but do not change the process data itself. As the process control network grows in size and complexity, the number and type of network devices correspondingly increases. As a result of system and network growth, security within and management of these complex systems is becoming increasingly difficult. As a start however, these networks are generally isolated from other external networks and are protected from external attacks by one or more firewalls.

Generally, in a typical industrial control system, in order to limit intrusions into the network, the plant control system workstations/servers are strategically placed between external plant networks that perform various functions associated with the plant, and the embedded control devices that perform control and data acquisition functions (e.g. controllers, PLCs, RTUs) within the control system. A major security objective for the control workstations/servers is to prevent malware from entering the control and maintenance system and adversely affecting the embedded devices, as well to prevent malware from changing the configuration and historical data stored in the plant process control databases. Still further, these workstations/servers prevent unauthorized access to the control system to prevent unauthorized changing of the plant configuration, unauthorized access to plant data, etc. While a number of security features, such as firewalls, "anti-virus" software and "white listing" can be used to address these security objectives, these security features are typically not sufficient. For example, anti-virus software cannot protect against "zero-day" viruses, and white listing only prevents unauthorized applications from running. In addition, some of these features are too intrusive to be operationally practical in a process control system because these security features have the potential to impede activities of plant operators or of the scheduled control operations.

In a general sense, malware, such as that at the heart of a zero-day attack, is typically introduced into the secured control system network via an authorized communications connection to an external network by operation of an application or a service that has the privilege or authorization to access the memory devices, network ports, or direct data links within the process control network. Alternatively, malware may be introduced into the secured control system network via local personnel that connect infected portable devices and/or media to a control system device. Thereafter, the malware is able to be propagated to other devices (e.g., via communications) and/or to be executed within a device within the process control network using the security privileges of the applications or services that become infected with the malware. In addition, the malware may locally persist itself to allow it to be executed again after reboot of networked devices. In some cases, the malware may escalate the privileges of a host, e.g., an infected application or a service, using the privileges of the account under which the application or service is being executed and, in doing so, the malware may be able to perform actions or operations within the process control device or network device that require a higher privilege, and are thus typically more detrimental to the control system operation. These attacks can have serious and potentially destructive or even deadly effects within a process plant when these attacks disrupt the on-going operation of the plant control system.

There has been a significant amount of research activity into defining and building hardware and software configurations that operate to prevent or limit attacks on process or industrial control and maintenance networks. However, even tightly defended industrial control system (ICS) networks or supervisory control and data acquisition (SCADA) networks are still subject to security threats such as misconfiguration of security defenses, users with legitimate access acting with malicious intent, and publicly unknown but malicious software acting on behalf of outside attackers. Moreover, once a network is infected, there is only a limited ability to automatically detect the existence of viruses or malware within a process or industrial control device or in plant communication nodes. Generally speaking, once an attack becomes successful in a plant environment, it generally requires an operator, a maintenance person, etc. to detect that a plant communication node or device is infected. While it is possible to run background virus scanning software at each node of a communications network, this software takes a lot of memory and processing resources, needs to be updated regularly (requiring significant network maintenance resources and time), and is still incapable of detecting zero-day viruses.

In many cases, viruses or unauthorized software at a plant device or network node may cause decreased performance of the device or network, may interrupt normal plant operations enough to cause errors or alarms to be generated at that node or other nodes within the network, or may cause other serious and noticeable issues. In some of these cases, it may be relatively easy for an operator or other plant personnel to detect the existence of a virus, but it may still be difficult to detect the location of the virus. Moreover, in many other cases, the virus or attack may operate undetected for a significant period of time because, while it may degrade network operations slightly, this degradation or other effect on the plant operation may be negligible, and so may be very difficult to detect. As a result, in many cases, viruses may go undetected for significant periods of time, during which time these viruses may operate to reduce plant efficiencies, to allow theft of plant data, to enable more serious intrusions, to expose network devices to serious attack or harm, etc.

SUMMARY

A control system, such as an industrial or process plant control or maintenance system, implements a communications network threat detection system that provides robust analysis and filtering of communications sent over the network to defend against potentially infected network nodes. Generally speaking, the analysis system includes a robustness agent that operates at an interface between a node device (e.g., a controller, a user interface, a switch, etc.) and the communications network, wherein the robustness agent analyzes and filters messages coming from or going onto the network, to ascertain the type of or information about the messages flowing through the robustness agent. The robustness agent may be configured to allow certain types of messages (e.g., messages with certain predetermined characteristics) to be passed through the agent to the network or to the device, may prevent messages with other predetermined characteristics from being passed through the agent, such as by discarding or filtering these messages, and/or may pass still other messages having other characteristics to a volume filter to be counted. The volume filter may operate to count the number of messages of a particular type (or with a particular set of message characteristics) and may operate to pass these messages if the number of these detected messages over a particular period of time is less than a particular threshold, but may filter these messages if the number of counted messages is greater than a particular threshold over a particular period of time. Generally speaking, the robustness agent can be configured so that its filtering operations can be changed over time based on changes made to the network, can be tweaked or set up for different types of networks or for networks in different plants, and can generally be configured to match the expected operation of any particular network in which the robustness agent or security system having a number of robustness agents is operated.

In a general sense, the security system that uses one or more such robustness agents prevents nodes that may be infected from passing messages that are of a type or that have characteristics that are highly likely to be associated with an intrusion, and prevents nodes that may be infected from sending a substantial amount of messages that may be associated with an intrusion onto the network. Moreover, this system helps to prevent nodes that are under attack from an infected node from accepting or receiving a substantial amount of messages from the network that may be associated with or caused by the intrusion. In particular, the robustness agent of the security system reviews outbound messages (from a node) to determine if these messages correspond with expected types of messages on the network based on the configuration of the network, e.g., to determine if the outbound messages are messages that have sets of characteristics that are expected within network communications as configured. In some cases, the security system may be configured to pass all messages of certain types (or with certain sets of characteristics) which may include messages of the type that are deemed to be needed or essential for network operation. In other cases, the security system may be configured to reject or filter out all messages of certain types or having certain characteristics, which messages should not occur during the normal operation of the network, as configured, and which are therefore likely to be generated by malware or an infected node within the system. In a third case, the security system may be set up to conditionally pass messages of certain types or having certain sets of characteristics, up to a certain volume or level, and then to filter those messages in some manner. In this case, it is possible that some limited number of messages of this third type are expected to occur within the network, as configured, but that these messages are suspect, in that only a certain level or volume of these messages is expected. The existence of messages of this type, over a certain level or volume during a particular period of time, may therefore be indicative that these messages are being generated by malware or another type of infection or intrusion into the network. If such a volume is detected, then the robustness agent may filter all of these messages, or may pass a limited number of these messages while filtering others, to keep the volume below a certain level, may notify a user, may run intrusion detection software, and/or may disconnect the device generating the messages from the network link to prevent an infected device from having access to the network.

In any event, each of the robustness modules of the security system may be configured to operate using a configuration file that specifies the types or characteristics of messages to pass, to filter, or to pass to the volume filter, the particular allowed volumes of various types of messages in the volume filter, the actions to be taken by the robustness agent when a volume threshold is reached or exceeded, etc. This configuration or the rules associated therewith may be stored in a read only flash memory attached to the robustness agent or the device in which the robustness agent operates, which makes the configuration data unchangeable during operation of the robustness agent, or may be stored in a read/write memory, which makes the configuration alterable and therefore more robust during operation of the network, thereby allowing the security system to be reconfigured during operation based on changes made to the network. In the latter case, however, the configuration file may be more susceptible to malware, which can operate to infect the configuration file. In some cases, some part of the rules may be stored in flash memory, while some data or lists used in the rules may be stored in a configurable manner in other types of memory.

Generally speaking, the configuration of the robustness agents may vary based on the network location and device to which each robustness agent is attached. Moreover, any number of robustness agents may be provided in a communications network to make up a network security system. While it may be desirable in some cases, it is not always necessary that each device in the network has its own robustness agent. Likewise, the configuration of each robustness agent may be set up to operate adequately because of the relatively static configuration of the network nodes, as well as the a priori nature of process or industrial control or maintenance system configurations used in a plant or a plant control network.

In one or more embodiments, a security system for use in a communications network having a plurality of network nodes communicatively coupled via a communications link includes one or more message module interfaces, wherein each of the message module interfaces executes on a processor at one of the network nodes to detect message traffic at the network node and to determine one or more message characteristics of each of the messages. The security system also includes a rules memory that stores one or more logic rules and the security system includes one or more filtering units stored in and executed on a processor and coupled to the rules memory, each of the filtering units including a first filtering module, and a second filtering module. In this case, the first filtering module executes on the processor and applies one or more logic rules stored in the rules memory based on the message characteristic information to pass the message, to halt the message, or to pass the message to the second filtering module. Moreover, the second filtering module counts the number of messages having a particular set of message characteristics to determine a message count and passes the message or halts the message having the particular set of message characteristics based on the message count.

If desired, the message count may comprise a particular number of messages with the particular set of message characteristics received within a particular time period. Still further, the rules memory may be a read-only memory, a read/write memory, or a memory that includes a first portion that is a read-only memory and a second portion that is a read/write memory. Additionally, the rules memory may be a flash memory, such as a removable flash memory.

Moreover, the security system may include a logging module coupled to the first and/or the second filtering modules, which executes on the processor, to receive information regarding one or more halted messages and to store information regarding the one or more halted messages in a log or log file. The logging module may include a communications interface that sends one more logs of halted messages to a user and may store metadata regarding the halted messages. The security system may also or instead include an alert generation module that is coupled to the second filtering module, wherein the alert generation module executes on the processor to send an alert to a user when the message count reaches a predetermined level. The alert generation module may also operate to disconnect a device (such as any device on the network generating a significant number of messages of a particular type or with a particular set of characteristics) from the communications network when the message count reaches a predetermined level. Still further, the one or more filtering units may include a first filtering unit that receives and analyzes messages coming into the network node from the communications link and a second filtering unit that receives and analyzes messages generated in the network node and being sent to another network node via the communications link.

In one or more other embodiments, a method of securing message traffic in a communications network includes receiving a series of messages at a device connected to the communications network and analyzing, via a processor at the device, each of the series of messages to determine one or more message characteristics of each of the messages. The method further includes filtering each of the messages, via the processor at the device, based on a set of logic rules stored at the device, the filtering including passing messages with one or more first sets of message characteristics, halting messages with one or more second sets of message characteristics, and counting messages with one or more third sets of message characteristics. Moreover, the method further includes passing or halting the messages with the one or more third sets of message characteristics based on counts associated with the one or more third sets of message characteristics.

In yet another one or more embodiments, a communications network includes a communications link and a plurality of network nodes, wherein each of the network nodes includes a network device coupled to the communications link and has a processor and a communications stack that executes on the processor to process messages coming from and going to the communications link. Still further, each of a plurality of the network nodes further includes one or more message module interfaces, wherein each of the message module interfaces executes on a processor at a network node to detect message traffic coming from the communications stack or from the communications link to determine one or more message characteristics of each of the messages. Each of the plurality of network nodes also includes a rules memory that stores one or more logic rule and includes a filtering module stored in and executed on a processor and coupled to the rules memory, that uses the set of logic rules stored in the rules memory to pass messages with one or more first sets of message characteristics, to halt messages with one or more second sets of message characteristics, and to count messages with one or more third sets of message characteristics. The filtering module further passes or halts the messages with the one or more third sets of message characteristics based on counts associated with the one or more third sets of message characteristics.

DESCRIPTION

Generally speaking, a network security system described herein implements threat detection and threat remediation by analyzing network traffic coming into and/or exiting out of one or more devices on a communications network to determine, based on one or more message characteristics, such as a message type, a sender, a receiver, a sender/receiver pair, etc., whether the message should be passed, filtered or processed further, all for the purpose of performing network security. In some cases, the further processing may include counting or detecting a volume of messages having a particular type (or other set of characteristics) within a particular period of time. The further processing may result in the messages with the particular type or other set of characteristics being either passed or quarantined (e.g., deleted), and/or may result in some other action being taken, such as running intrusion detection software at the node, taking a device off of the network to protect the network from an infection within the device, etc. The security system described herein performs effectively because the a priori nature of the industrial system or process control network configuration enables basic message traffic to be analyzed (and to be relatively known and static) based on expected or known traffic statistics that result from a particular network configuration. That is, the configuration of network communications in process control, industrial system, or plant automation networks is generally fairly well known prior to implementation or operation of the communications network, and thus the basic configuration of the network traffic does not tend to change significantly during use or operation of these networks. Instead, network communication traffic tends to be fairly static (in a statistical sense) during operation of the communications network and, thus, changes in the types or characteristics of the network messages or message patterns, especially in a statistical sense, may be indicative of an intrusion into the network that is not part of the original or desired configuration.

Generally speaking, industrial control system devices with, for example, Ethernet interfaces, are subject to various network traffic patterns and conditions that have the potential to adversely affect device behavior. A security system as described herein is capable of being configured or updated with rules that regulate specific message traffic patterns on network, such as into and out of the devices on the network. However, control system operators need devices that are robust in the face of anomalous traffic, and thus the security system described herein may be configured on the fly to detect and handle traffic appropriately to prevent adverse device behavior. In some cases, the rules may be dynamically configurable, the rules may have dependencies based on conditions or other rules to provide predictive protection, the rules may dynamically invoke other rules to provide for efficient, robust operation, and the rules may be adaptable to specific traffic patterns in specific installations. Moreover, the security system described herein may automatically create rules to protect against dynamically discovered adverse traffic patterns and/or conditions while the network is operational. Still further, in some cases, the security system is able to identify and prevent attacks from compromised control system devices or nodes by analyzing egress traffic exiting those devices and discarding anomalous traffic not conforming to allowed traffic rules or message types, thereby preventing the use of these devices in the control system to launch malicious network attacks.

More particularly, the security system described herein includes a configurable robustness agent located at one or more nodes of a communications network on which security is being performed. In a general sense, the configurable robustness agent operates to manage (e.g., limit) the flow of message traffic into and/or out of a communication node under the theory that the existence of a particular type, flow or pattern of messages having certain predefined characteristics may be indicative of malware operating in the node (or in some other node and attacking the node) or may otherwise be indicative of an attack on or from the node. The robustness agent operates to limit the effects of such an attack by analyzing each of the messages flowing into or out of the node to determine if the messages have characteristics which are (1) expected, (2) not expected, or (3) expected to a certain extent but only at a limited volume or level. If an incoming message has a set of characteristics (e.g., a message type, a certain sender or receiver or a sender/receiver pair, etc.) that is expected in the network communications, the robustness agent may simply pass the message (either into the node when the message is an incoming message from the network, or onto the network link, when the message is an outgoing message from the node). If an incoming message has a set of characteristics (e.g., a message type, a certain sender or receiver or a sender/receiver pair, etc.) that is not expected in the network communications at the receiving or sending device, the robustness agent may delete, filter, or quarantine the message to prevent the message from reaching the higher levels of the communication stack in the node (when the message is an incoming message from the network) or from being placed onto the network link (when the message is an outgoing message from the node). If an incoming message has a set of characteristics (e.g., a message type, a certain sender or receiver or a sender/receiver pair, etc.) that is somewhat expected in the network communications but only at a limited level or volume, the robustness agent may count the messages of that type or having that set of characteristics, to determine the number of messages of that type or having that set of characteristics that are passing through the robustness agent over a particular period of time.

In this case, the robustness agent may pass the message if the volume is under a particular level, and may block or quarantine the message if the volume is over a particular level or threshold. Moreover, if the volume is over a particular level, indicating that the node is under attack or has malware or an infection that is attacking the network, the robustness agent may take further actions to protect the communications network. For example, the robustness agent may disconnect the node at which the robustness agent is located when that node is sending out to many messages of a particular type onto the network. Alternatively, when the robustness agent detects an attack from another node (based on the number or volume of suspect messages from that other node), the robustness agent may send a signal or a message to the other node (e.g., over the communications network) to cause the other node to disconnect itself from the network. In these or other cases, the robustness agent may notify a user or operator of a potential attack and some of the specifics of the attack, may invoke malware or intrusion detection applications at one or more nodes of the network to determine if there is a virus, malware, or other intrusion at these nodes, or may take any other desired action.

If desired, the robustness agent may be configurable to enable the robustness agent to be better suited to the particular network environment in which it is located, the particular node at which it is located, etc. In particular, the robustness agent may be configurable based on the expected message traffic into and out of a particular node, which may change or be different based on the type of node (e.g., a controller node, a user interface node, a database node, etc.), based on the location of the node, etc. Moreover, the configurable nature of the robustness agent may enable the robustness agent to operate better (e.g., be configured) based on detected statistics of the message traffic at the node, or in response to changes in the configuration of one or more nodes of the communications systems, etc.

Figure 1:
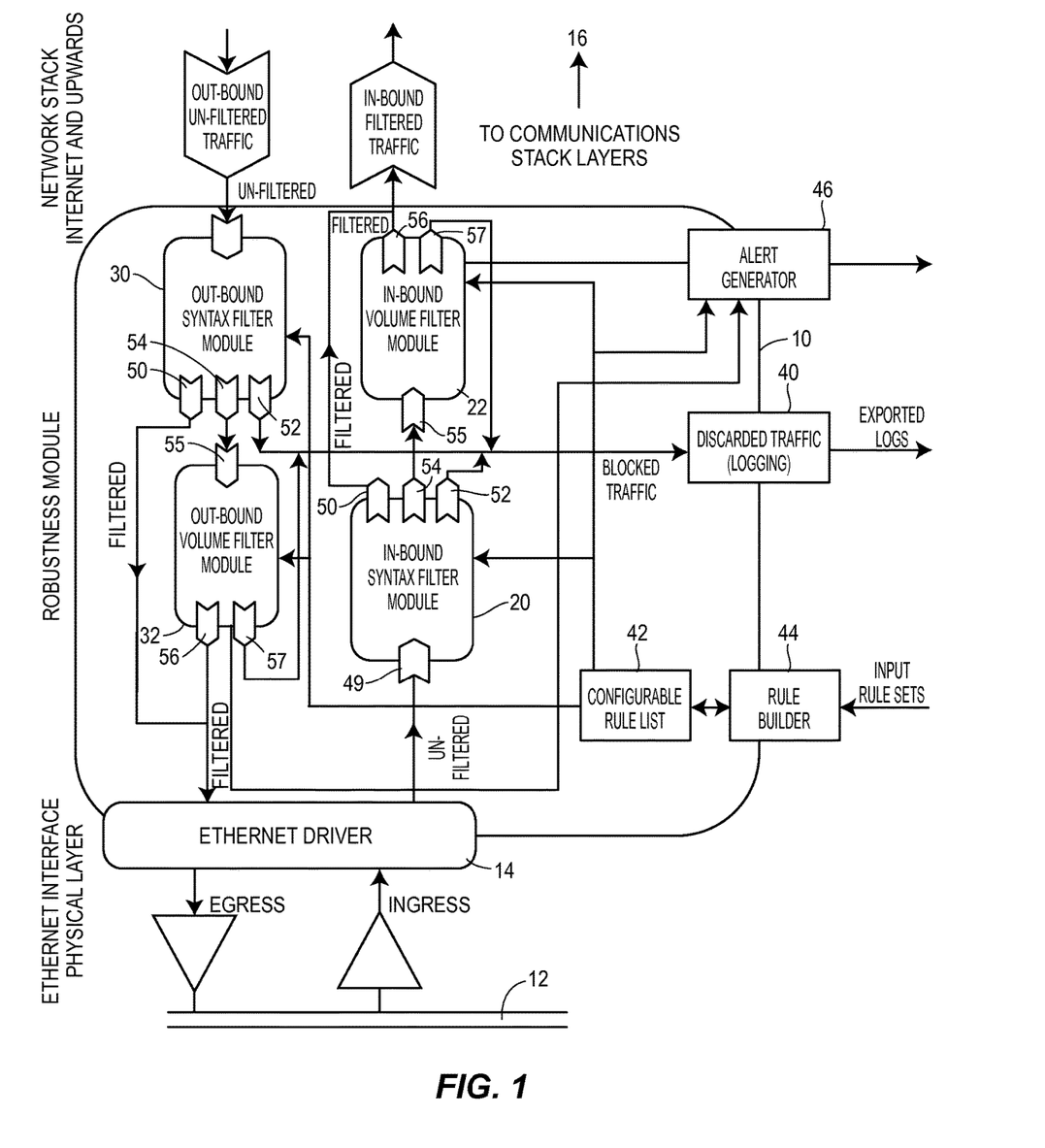
FIG. 1 depicts a configurable robustness agent that may be used in a process control network to limit the effect of an intrusion into the network.

FIG. 1 illustrates an example robustness agent or module 10 that may be used in a communications network to perform the functions described above. In particular, the robustness module 10 is disposed at an interface of a network node (e.g., a network device) and the physical layer of the network link 12. More particularly, the robustness module 10 may be coupled between a network driver, such as an Ethernet driver 14, that is connected to the network link 12 and the higher layers of the network communications stack 16 of the network device. As illustrated in FIG. 1, the robustness module 10 may include an in-bound syntax filter module 20 and an in-bound volume filter module 22 coupled between the driver 14 and the network stack 16 to process messages being sent from the network link 12 to the network device. The robustness module 10 may also include an out-bound syntax filter module 30 and an out-bound volume filter module 32 coupled between the network stack 16 and the driver 14 to process messages being sent from the network device (the network communications stack 16) to the network link 12. The robustness module 10 also includes a discarded message logging block 40 connected to each of the modules 20, 22, 30 and 32, a rule memory 42 that stores configuration rules (e.g., logic rules) that may be implemented by one or more of the modules 20, 22, 30, and 32, and a rule builder block 44 that may be used to build (e.g., establish or change) the rules in the rule memory 42. Still further, the robustness module 10 may include an alert generator 46 which may operate to provide alerts to users when one of the volume filters 22 or 32 detects a significant volume of messages of a particular type (e.g., having a particular set of characteristics). The alert generator 46 may also or instead perform other actions, such as initiating malware or virus detection software at the device or at a different node of the network, disconnecting the device from network, or sending a message to a robustness agent at another node of the network to have that node disconnect itself from the network, etc.

During operation, messages are received from the communications link 12 and are processed at the driver 14 to, for example, determine if each of the messages on the link 12 is addressed to the particular network device or to an address or application within or associated with that device. Of course, the driver 14 can be any known or desired type of network driver, such as an Ethernet driver as illustrated in FIG. 1, and may operate in any known manner. Messages that are bound for the network device are then passed to an input 49 of the in-bound syntax filter module 20, which analyzes these messages to determine one or more characteristics of the messages. These characteristics may include the type of message (e.g., UDP, TCP, etc.), a sender and/or receiver associated with the message, a message length, a parity, a security type, a priority of the message, a port sending or receiving the message, or any other desired message characteristic. These one or more message characteristics may generally be found in or determined from information in the header and/or the trailer or other encapsulation portion of the message, although characteristics of the payload or data portion of the messages may also be examined and used for filtering.

Generally speaking the in-bound syntax filter module 20 will determine one or more sets of characteristics of each message (which sets of characteristics may be stored in or provide by the rule memory 42 or which may be hard-coded into the syntax module filter 20). After determining the one or more sets of characteristics associated with a message, the syntax filter module 20 will then apply one or more logic rules which operate based on these determined characteristics to decide how to further process the message. In particular, based on the determined message characteristics and the rules in the rule memory 42, the syntax filter module 20 may pass a message (deemed to be a safe or an expected message) from an output 50 directly to the output of the robustness module 10 and thus onto the next layer of the network communications stack 16 of the network device, where the message will be decoded, processed, and passed to the appropriate receiver in the network device in any standard manner. In other cases, based on the determined message characteristics and the rules in the rule memory 42, the syntax filter module 20 may pass a message (deemed to be unsafe or definitely not allowed in the network) from an output 52 to the discarded traffic logging block 40, which may log this message, metadata about this message, or other information about the message for future use in analyzing network intrusions, changing rules in the rule memory 42 to perform better or more accurate filtering, etc. In still other cases, based on the determined message characteristics and the rules in the rule memory 42, the syntax filter module 20 may pass a message (deemed to be potentially unsafe) from an output 54 to an input 55 of the in-bound volume filter module 22.

Generally speaking, the in-bound volume filter module 22 deals with messages that have characteristics indicating that these messages may be, but are not necessarily, legitimate, as these messages may be of a type or have characteristics that are used in legitimate network traffic and that also used by typical malware or viruses to attack a system, especially in volume. The in-bound volume filter module 22 receives these messages (as detected by the in-bound syntax filter module 20) and counts these messages (using one or more counters) and additionally may keep track of how many such messages are received over a particular period of time or over a particular length of time in the past. Thus, the in-bound volume filter module 22 determines the volume of message traffic (e.g., number of messages over or in a particular period of time) of messages having a certain set of message characteristics. Of course, the in-bound volume filter module 22 may track message volumes for any number of different sets of message characteristics.

In any event, if the current volume of a message type (i.e., messages with a particular set of characteristics) is under a predetermined threshold (which threshold may be stored in the rule memory 42), the in-bound volume filter module 22 may pass the message via an output 56 to the stack 16 for processing in the network device. On the other hand, if the current volume of a message type (i.e., messages with a particular set of characteristics) is over a predetermined threshold (which threshold may be stored in the rule memory 42), the in-bound volume filter module 22 may block or discard the message by, for example, providing the message via an output 57 to the discarded traffic logging block 40. Here, again, the block 40 may log the message and/or metadata about the message to determine statistics about these blocked messages. Still further, the in-bound volume filter module 22 may compare the current volume of a message type to multiple thresholds, or may use multiple thresholds to determine actions to be taken. For example, when a message is received at the volume filter module 22 and the current detected volume of this type of message is under a first (e.g., lower) threshold, the volume filter module 22 may pass this message to the stack 16 of the network device. However, when a message is received at the volume filter module 22 and the current detected volume of this type of message is greater than the first (e.g., lower) threshold but less than a second (e.g., higher) threshold, the volume filter module 22 may block the message by sending the message to the logging block 40. However, when a message is received at the volume filter module 22 and the current detected volume of this type of message is greater than the second (e.g., higher) threshold, the volume filter module 22 may block the message (by sending the message to the logging block 40) and may also perform some further action to protect the network. For example, when a second or higher volume threshold is passed, the volume filter 22 may communicate with the alert generator 46 which may send an alert to a user indicating a potential attack on the network device, may disconnect the network device from the network link 12 to protect the device from attack, may send a message to another device, such as a device that is sending the messages, to have that device disconnect itself from the network to protect the network, may initiate malware or virus detection software within a device, etc. Of course, any number of different volume level thresholds may be established to provide or cause the alert generator 46 to take different actions in the network.

As illustrated in FIG. 1, the robustness module 10 also includes an out-bound filtering path defined by the out-bound syntax filter module 30 and the out-bound volume filter module 32. In this case, the out-bound syntax filter module 30 operates similarly to the in-bound syntax filter module 20 and the out-bound volume filter module 32 operates similarly to the in-bound volume filter module 22, except that the modules 30 and 32 operate on out-going messages received from the communications stack 16 which are being sent to another device via the network link 12. Moreover, while the modules 30 and 32 may use the same rules as those used by the modules 20 and 22, respectively, the modules 30 and 32 may use different rules to allow different filtering operations on out-bound messages than those applied to in-bound messages. Thus, the modules 30 and 32 operate together on out-bound messages in essentially the same manner as described above with respect to the modules 20 and 22 operating on in-bound messages, to thereby protect other devices on the network from potential malware and infections residing in the node or the device at which the robustness module 10 is located. The out-bound modules 30 and 32 may therefore operate to detect the existence of malware, viruses, or other sources of intrusion residing in the device associated with the robustness agent 10, and may operate to communicate with the alert generator 46 to have the alert generator send an alert to a user and/or to disconnect that device from the network when for example, the volume filter 32 detects a predetermined level or volume of out-bound messages of a particular type or configuration being sent from the device.

During operation, the logging block 40 may operate to receive, analyze and track discarded messages. In particular, the logging block 40 may determine various metadata about each of the discarded messages including timing, sender/receiver, type of message, length of message, the reason that the message was discarded at a syntax or volume filter module, etc. and may create a log for the messages. The block 40 may create separate logs for incoming and outgoing messages, for each type of message, for each sender/receiver of messages, etc. Of course, the logging block 40 may create any other types of logs and may send these logs to a user interface, a database device, or any other device up request, periodically, a log becomes a certain length, or in response to any other desired triggering event. Still further, the logging block 40 may log information and/or send logged information about the discarded messages based on preconfigured and hardcoded rules or based on rules from the rule list 42, if so desired. In this manner, the logging of discarded messages may be configured as well. The logging block 42 may export logs over the network link 12 if so desired, or may export logs via any other communication connection to the robustness module 10, such as a local connection.

Likewise, as indicated above, the configurable rule list 42 may store rules for each of the in-bound syntax filter module 20, the in-bound volume filter module 22, the out-bound syntax filter module 30, the out-bound volume filter module 32, the logging block 40, and the alter generator 46. These rules may be configurable via the rule builder module 44 which may communicate with another application (via the network link 12 or via any other communication connection to the robustness module 10, such as a blue-tooth connection, a wireless internet connection, an intermittent hardwired connection from a handheld device, etc.) to receive one or more rules sets used to build the rules stored in the rule list 42. The other application may be a rule builder application stored in a user interface (such as a configuration interface) on the network link 12, or stored in a handheld device that intermittently connects to the module 10 via, for example, a hardwired or a wireless communication connection, etc.) If desired, the rule builder 44 may be a communication interface to the module 10 to enable on-line or on-the fly configuration of the rules stored in the rule list 42, to thereby enable the robustness module 10 to be reconfigured in light of new configurations on the network, changing statistics of message traffic, etc. However, if desired, the rule builder 44 may be write protected flash memory that can internal to the device or that may be plugged into an interface (e.g., a USB port or other external memory port) of the device in which the robustness module 10 is located. Because such a flash memory is not writable during use, the rules stored on the flash memory are not able to be changed, which protects the robustness module 10 from being able to be infected via a change in the rules list 42. That is, to change the rule list 42, the flash memory 44 needs to be removed and replaced with new rules thereon for use in the robustness module 10. While this configuration of the rules list 42 makes the robustness module 10 more secure from intrusion, it also makes the system less configurable on the fly. Of course, if desired, the rule memory 42 could be incorporated into the same module as the rule builder 44. In one case, some of the rules in the rule list 42 may be stored in flashed memory and thus not be configurable, while these rules may use lists that are stored in memory, such as in the rules list 42, that can change during operation, to thereby allow some on-the-fly configuration of the robustness module 10. For the sake of example only, Table 1 below provides an example set of rules that may be used for each of the in-bound and out-bound syntax and volume filters of a robustness module. Table 1 also defines, for each rule, whether the rule is stored in flashed memory, if the rule is configurable, if the rule uses a windows operating system implementation, and if the rule is used in embedded devices in the network (e.g., controllers). Of course, Table 1 provides only a single example of a set of rules that can be used in a particular robustness module 10, and any other types and numbers of rules can be used in any particular robustness module 10.

TABLE 1

| Rule Description | Flashed in? | Configurable? | Windows? | Embedded? |
|---|---|---|---|---|
| Syntax In-bound Filter | | | | |
| Discard all packets aimed at a specific port (e.g., discard packets to UDP port 199). | YES | YES* (e.g. New UDP Ports can be included in the discard inbound port traffic list) | YES | YES |
| Discard all packets that have invalid lengths (e.g., if the length in the IP header is too short for a TCP packet). | YES | NO | NO | YES |
| Discard packets of technically valid length but that do not fall within the expected length for control network environment (e.g., discard UDP packets that are above minimum UDP length as specified by the protocol but shorter/longer than what is expected of control traffic.) This rule can be further defined by IP address range and Port. | YES | YES | YES - May be restricted to Control network IP Address range and Port | YES |
| Volume In-bound Filter | | | | |
| Discard packets of a specific type from a single source after too many have been received within a time period (e.g. TCP SYNs). | YES | YES* (e.g., new Source IP's can be included a separate the discard port traffic list) | YES | YES |
| Discard all packets after maximum packet discard limit is reached. The types of packets that would count against this discard limit may be configurable (e.g., Bogus TCP SYNs, TCP URGs). | YES | YES | YES | YES |
| Discard packets after too many have been received within a particular time period (e.g., TCP URGs). | YES | YES* (e.g., Packet count Limits can be tuned for specific packet types) | YES | YES |
| Performing packet rate limits for UDP traffic exceeding expected maximum levels. The rate limits may be configurable. | YES | YES | YES | YES |
| Syntax Out-bound Filter | | | | |
| Discard packets that would be sent to a port the device would not normally communicate on or through. | YES | YES* (e.g., new ports can be included in a separate | YES | YES |

TABLE 1-continued

| Rule Description | Flashed in? | Configurable? | Windows? | Embedded? |
|---|---|---|---|---|
| | | discard outbound port traffic list) | | |
| Discard packets with invalid length (e.g., the length in the IP header is too short for a TCP packet). | YES | NO | NO | YES |
| Discard packets of technically valid length but that do not fall within the expected length for control environment, indicating some erroneous behavior on the device/system (e.g., discarding UDP packets that are above minimum UDP length as specified by the protocol but shorter/longer than what is expected of the controller protocol traffic). This rule can be further defined by IP address range and Port. | YES | YES | YES - restricted to Control network IP Address range and Port | YES |
| Limit outbound traffic to known network subnet IP address ranges (e.g., block any traffic going out to IP addresses 8.8.8.8 and 8.8.4.4). | YES | YES | YES | YES |
| Volume Out-bound Filter | | | | |
| Discard outbound TCP SYNs after a certain amount are received in a particular length of time or time period, depending on how much TCP traffic is expected | YES | YES * (e.g., Configurable parameters generally include volume limits, and matching for specific packet signatures can be turned on/off) | NO | YES |
| Discard an excessive number of packets that are not typically used, like ICMP pings | YES | YES * (e.g., Configurable parameters generally include volume limits or include new Packet Signatures that can be included in the rule set) | YES | YES |
| Discard excessive number of Max Length UDP packets exceeding the configurable thresholds. | YES | YES | YES | YES |

Figure 2:
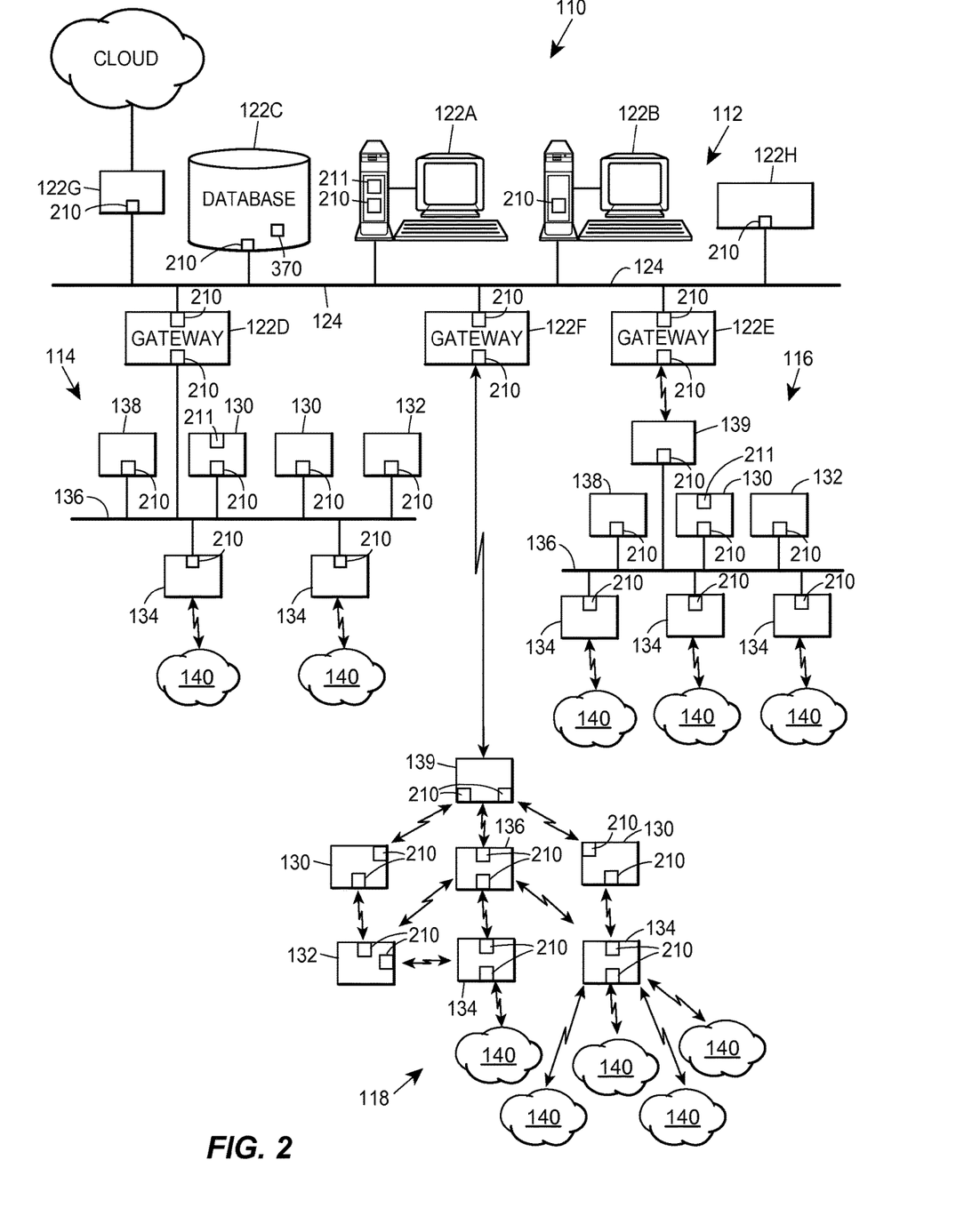
FIG. 2 is an exemplary block diagram of a process or industrial plant having multiple interconnected communications networks in which one or more robustness agent based security systems can be implemented.
Figure 3:
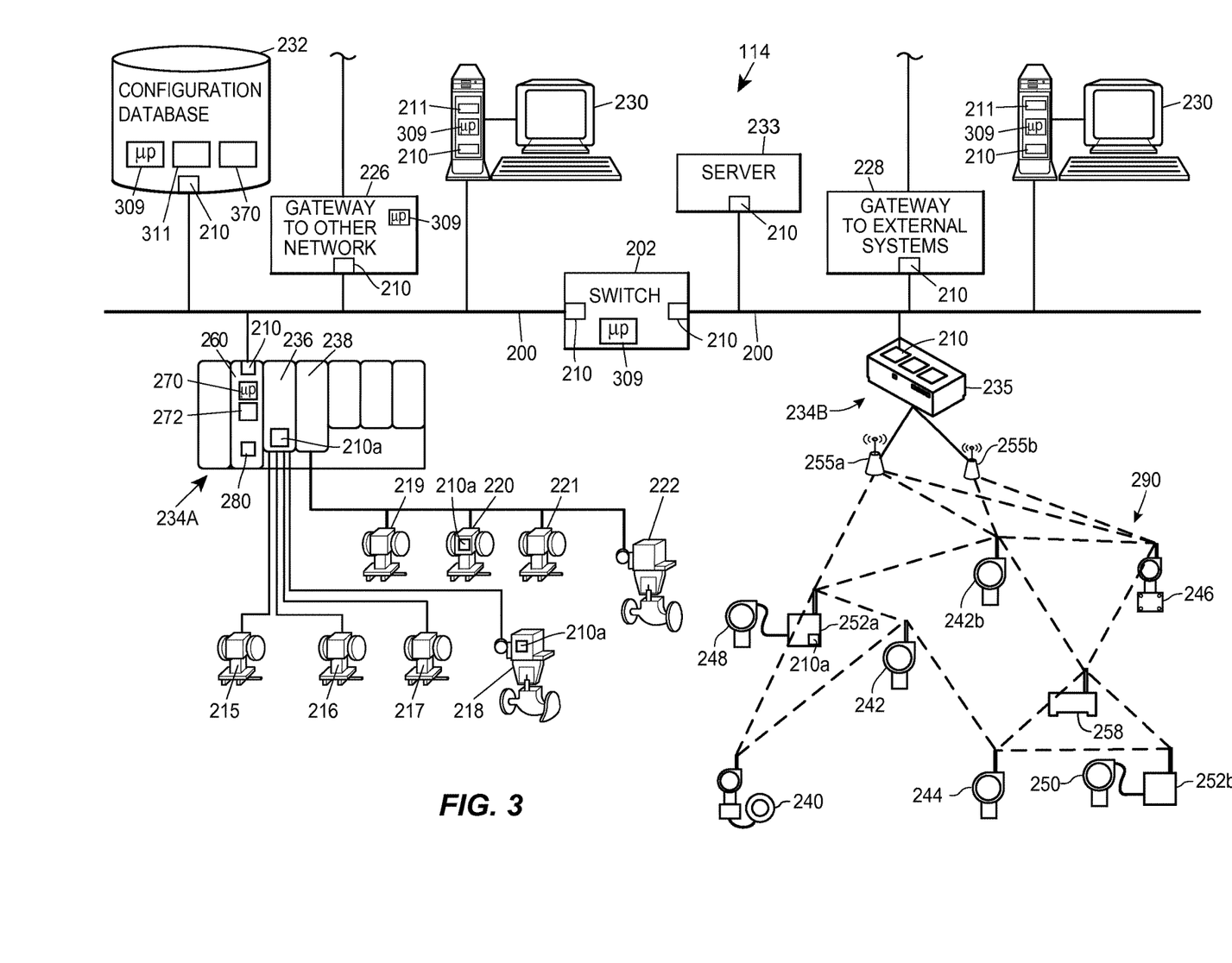
FIG. 3 is an exemplary diagram of one of the plant networks of FIG. 2, in the form of a distributed process control system and process automation network, having various network nodes including operator and maintenance workstations, servers, and controller nodes, in which a security system using the robustness agent of FIG. 1 operates to limit the effects of and to potentially detect infected or compromised nodes.

By way of example only, FIGS. 2 and 3 illustrate example plant networks in which a network security system made up of one or more of the robustness modules 10 of FIG. 1 can be installed and used. In particular, FIG. 2 illustrates a plant or industrial communications system 110 including a number of different but interconnected communications networks 112, 114, 116 and 118, each having various network nodes. The communications network 112 of FIG. 2 may be a business communications network including multiple nodes 122A-122H interconnected by a communications bus 124 which may be, for example, an Ethernet bus or any other wired or wireless communications bus or network. The nodes 122A, 122B may include, for example, computers, servers, workstations, etc., at which business applications or programs are run, and the node 122C may be, for example, a database that stores business data, industrial plant configuration data, or any other desired data regarding the plant. Likewise, the nodes 122D, 122E, and 122F may be gateway nodes that connect the network 112 to the other communications networks 114, 116, 118, respectively, and to allow inter-network communications. Still further, a node 122G may be a gateway node that connects the network 112 to the internet, the cloud, or other wide area network to enable the network 112 to communicate with remote servers, plants, or other computers.

In this example, the networks 114, 116 and 118 are plant (such a process plant or industrial plant) control networks that include various nodes interconnected by a wired or a wireless communication bus or network link. Each of the plant control networks 114, 116, 118 may include any of various types of devices at the nodes thereof. For example, the plant control networks 114 and 116 are illustrated as wired communications networks that each includes one or more user interface devices 130, a database or historian 132 which may store plant control network configuration data for the networks 114 and/or 116, one or more process controller nodes 134 interconnected via a communications bus 136, in this case in the form of an Ethernet communications bus, and one or more server or processor nodes 138. The process control nodes 134 may include one or more process controllers communicatively coupled to other devices such as input/output (I/O) and field devices (e.g., sensors, valves, controlled devices, etc.) via one or more wired or wireless sub-networks 140. The field devices in the sub-networks 140 may take the form of, for example, valves, sensors, transmitters or other measurement or control devices that measure some parameter or process variable in the plant, or that perform some physical control action related to material operation or material flow within the plant. The field device sub-networks 140 may, for example, use any desired process control communication protocol or paradigm, such as the Highway Addressable Remote Transmitter (HART®) protocol, the FOUNDATION® Fieldbus protocol, the Profibus protocol, the CAN protocol, etc. Still further, the field device sub-networks 140 may be implemented as wired or wireless networks, such as WirelessHART® networks. The networks 114 and 116 may also include gateway devices at the nodes 122D, 122E that connect the networks 114 and 116 to the network 112, to the internet or other WANs, etc. Of course, these gateway devices may provide firewall and other security features or applications.

In a similar manner, the communications network 118 is illustrated as a wireless communications network that may use a wireless communication protocol such as a wireless Ethernet protocol, the WirelessHART® protocol, the ISA100 wireless protocol, etc. The communications network 118 is illustrated as including various devices, such as user interface devices or workstations 130, databases 132, process controllers 134, servers 136, field device sub-networks 140, gateway devices 139, etc. Of course, any number of these and other types of devices may be located at the various nodes of the communications networks 114, 116 and 118. It will be understood that any or all of network devices within the networks 112, 114, 116, 118 may include one or more computer readable memories and processors on which various software modules, including any of the modules associated with the robustness module 10 of FIG. 1 and described herein, may be stored and executed.

Importantly, a security system described herein may be implemented in any and all of the networks 112, 114, 116, and 118 of FIG. 2 to limit the effect of intrusions into these networks in the form of, for example, malware or other unauthorized applications running in various nodes of these networks. Generally speaking there may be a separate robustness module based security system for each of the networks 112, 114, 116, and 118, or even for each of the nodes in any of the networks 112, 114, 116, 118. On the other hand, in some cases, a single security system may be used to cover multiple ones of the networks 112-118, such as the networks 114 and 116 or the networks 112 and 114, etc.

As an example, as generally illustrated in networks 114, 116, and 118 of FIG. 2, a robustness module based security system includes a robustness module 210 located at the interface (e.g., in the communication stack) of each of the nodes of each these networks and the communication link to which these networks are attached. Here, the robustness modules 210 (also referred to herein as in transit traffic analysis agents) may be of the form described above as the robustness module or agent 10 of FIG. 1. Additionally, while FIG. 2 illustrates a robustness module at each node of each network, it may not be necessary to provide a separate robustness module in each node of a network being protected. Instead, the security described herein could use one or more robustness modules in a network without necessarily having a robustness module located at each node of a network. For, example, a security system may include robustness modules 210 at the network interface of embedded devices of a network, such as controllers, without having a robustness module 210 at more complicated devices, such as user interface devices. In any event, the robustness modules 210 could be installed at any desired devices in a network in any desired manner, and a security system using these robustness modules is not limited to the examples specifically described herein. Moreover, the security system may include a configuration and user interface support module 211 located in one or more of the nodes of the networks 112, 114, 116, and 118. The user interface support and configuration application 211 is stored in a computer readable memory and executes on a processor of these devices to provide a user with the ability to configure the rules in the rule list 42 of any of the robustness modules 210, may enable a user to view the discarded traffic logs of any or all of the robustness modules 210 of the network being protected, may enable a user to see what devices or nodes are taken offline or are currently suspect in terms of sending or receiving high volumes of suspect message traffic, and may provide an environment that enables the user to configure any of the robustness modules 210 to provide for better or enhanced security.

Generally speaking, each of the robustness modules 210 views or analyzes in-bound and out-bound messages according to the rules within the module to allow messages to pass, to block suspect messages, and/or to count and perform volume filtering on messages. The robustness modules 210 may operate independently, or may be coordinated in a particular network or even across networks, to provide coordinated message filtering.

As a further example, FIG. 3 illustrates the communications network 114 of FIG. 2 in more detail. In this example, the communications network 114 includes a wired Ethernet bus 200 which may include one or more switches 202 that interconnect various devices such as gateway devices (e.g., a gateway to other networks 226, a gateway to external systems 228, such as to the internet), one more user interface devices or workstations 230, a configuration database 232, a server 233, and two process control nodes 234A and 234B. Here, the first process control node 234A includes one or more redundant process controllers 260 that is/are communicatively connected to wired field devices 215-222 via input/output (I/O) cards 236 and 238, and is communicatively connected to wireless field devices 240-258 via a wireless gateway 235 and the network backbone 200. In this case, the wireless gateway 235 is the second control node 234B of the network 114. In another embodiment, though, the controller 260 at the node 234A may be communicatively connected to the wireless gateway 235 using a communications network other than the backbone 200, such as by using another wired or a wireless communication link or I/O module.

The controller 260, which may be, by way of example, a DeltaV™ controller sold by Emerson Process Management, may operate to implement one or more batch processes or continuous processes, maintenance applications, safety system applications, etc., using at least some of the field devices 215-222 and 240-258. The controller 260 may be communicatively connected to the field devices 215-222 and 240-258 using any desired hardware and software associated with, for example, standard 4-20 ma device protocols, and/or any smart communication protocol such as the FOUNDATION® Fieldbus protocol, the HART® protocol, the WirelessHART® protocol, etc. The controller 260 may additionally or alternatively be communicatively connected via the input/output (I/O) cards 236, 238 with at least some of the field devices 215-222 and 240-258 via other types of connections. In the network 114 illustrated in FIG. 3, the controller 260, the field devices 215-222 and the I/O cards 236, 238 are wired devices, and the field devices 240-258 are wireless field devices. Of course, the wired field devices 215-222 and wireless field devices 240-258 could conform to any other desired standard(s) or protocols, such as any wired or wireless protocols, including any standards or protocols developed in the future.

The controller 260 of FIG. 3 includes a processor 270 that implements or oversees one or more process control routines (stored in a memory 272), which may include control loops. The processor 270 may communicate with the field devices 215-222 and 240-258 and with other nodes that are communicatively connected to the network backbone or link 200 in order to perform control activities, or other activities such as maintenance, monitoring and safety system activities. It should be noted that any of the control routines or modules may have parts thereof implemented or executed by different controllers or other devices if so desired. Likewise, the control routines or modules which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 260 may be configured to implement a control strategy or control routine in any desired manner.

In some embodiments, the controller 260 implements a control strategy using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device, a control function, such as that associated with a control routine that performs proportional, integral, derivative (PID), fuzzy logic, etc., control, or an output function which controls the operation of some device, such as a valve, to perform some physical function within the process control system. Of course, hybrid and other types of function blocks exist. Function blocks may be stored in and executed by the controller 260, which is typically the case when these function blocks are used for, or are associated with standard 4-20 ma devices and some types of smart field devices such as HART devices, or may be stored in and implemented by the field devices themselves, which can be the case with Fieldbus devices. The controller 260 may include one or more control routines 280 that may implement one or more control loops. Each control loop is typically referred to as a control module, and may be performed by executing one or more of the function blocks.

The wired field devices 215-222 may be any types of devices, such as sensors, valves, transmitters, positioners, etc., while the I/O cards 236 and 238 may be any types of I/O devices conforming to any desired communication or controller protocol. In the embodiment illustrated in FIG. 3, the field devices 215-218 are standard 4-20 ma devices or HART devices that communicate over analog lines or combined analog and digital lines to the I/O card 226, while the field devices 219-222 are smart devices, such as FOUNDATION® Fieldbus field devices, that communicate over a digital bus to the I/O card 238 using a FOUNDATION® Fieldbus communications protocol. In some embodiments, though, at least some of the wired field devices 215-222 and/or at least some of the I/O cards 236, 238 may communicate with the controller 260 using a big data network. In some embodiments, at least some of the wired field devices 215-222 and/or at least some of the I/O cards 236, 238 may be nodes of the process control system network 114.

In the embodiment illustrated in FIG. 3, the wireless field devices 240-258 communicate in a wireless network 290 using a wireless protocol, such as the WirelessHART® protocol. Such wireless field devices 240-258 may directly communicate with one or more other nodes of the network 114 that are also configured to communicate wirelessly (using the wireless protocol, for example). To communicate with one or more other nodes that are not configured to communicate wirelessly, the wireless field devices 240-258 may utilize the wireless gateway 235 connected to the communications backbone 200 or to another process control communications network. In some embodiments, at least some of the wireless field devices 240-258 may be nodes of the process control system network 114.

The wireless gateway 235 provides communicative coupling between the wireless devices 240-258, the wired devices 215-222, and/or other nodes of the process control network 114. The wireless gateway 235 provides communicative coupling, in some cases, by the using routing, buffering, and timing services in lower layers of the wired and wireless protocol stacks (e.g., address conversion, routing, packet segmentation, prioritization, etc.) while tunneling a shared layer or layers of the wired and wireless protocol stacks. In other cases, the wireless gateway 235 may translate commands between wired and wireless protocols that do not share any protocol layers. In addition to protocol and command conversion, the wireless gateway 235 may provide synchronized clocking used by time slots and superframes (sets of communication time slots spaced equally in time) of a scheduling scheme associated with the wireless protocol implemented in the wireless network 290. Furthermore, the wireless gateway 235 may provide network management and administrative functions for the wireless network 290, such as resource management, performance adjustments, network fault mitigation, monitoring traffic, security, and the like.

Similar to the wired field devices 215-222, the wireless field devices 240-258 of the wireless network 290 may perform physical control functions within the process plant, e.g., opening or closing valves or take measurements of process parameters, or perform other functions. The wireless field devices 240-258, however, are configured to communicate using the wireless protocol of the network 290. As such, the wireless field devices 240-258, the wireless gateway 235, and other wireless nodes of the wireless network 290 are typically producers and consumers of wireless communication packets.

In some scenarios, the wireless network 290 may include non-wireless devices. For example, a field device 248 of FIG. 3 may be a legacy 4-20 mA device and a field device 250 may be a traditional wired HART device. To communicate within the network 290, the field devices 248 and 250 may be connected to the wireless communications network 290 via a wireless adaptor (WA) 252a or 252b. Additionally, the wireless adaptors 252a, 252b may support other communication protocols such as FOUNDATION® Fieldbus, PROFIBUS, DeviceNet, etc. Furthermore, the wireless network 290 may include one or more network access points 255a, 255b, which may be separate physical devices in wired communication with the wireless gateway 235 or may be provided within the wireless gateway 235 as an integral device. The wireless network 290 may also include one or more routers 258 to forward packets from one wireless device to another wireless device within the wireless communications network 290. The wireless devices 240-258 may communicate with each other and with the wireless gateway 235 over wireless links of the wireless communications network 290 illustrated by dotted lines in FIG. 3.

Although the network 114 of FIG. 3 only illustrates a single controller 260 with a finite number of field devices 215-222 and 240-258, this is only an illustrative and non-limiting embodiment. Any number of controllers may be included on the network 114, and the controller 260 may communicate with any number of wired or wireless field devices 215-222, 240-258 to, for example, control a process in the plant. Furthermore, the process plant may also include any number of wireless gateways 235, routers 258, access points 255, and wireless process control communications networks 290.

Generally speaking, a security system may be installed or implemented in the network 114 in any desired manner using one or more robustness modules configured as described with respect to FIG. 1. In particular, as illustrated in FIG. 3, the security system includes robustness modules 210 disposed in each of the network nodes 226, 228, 230, 232, 233, 234A, and 234B, and in any of the switches 202 or other endpoint devices of the network 114. While not shown in full detail in FIG. 3, the robustness modules 210 may be installed in any of the sub-node devices, such as in the I/O devices 236 and 238, in one or more of the wired field devices 215-222 or in any or all of the wireless devices 240-258. In FIG. 3, each of the robustness modules 210 in a sub-node device is labeled with the reference number 210a to show that it is in a sub-node of a larger node of the network 114. As indicated with respect to FIG. 1, the robustness modules 210 and 210a analyze traffic into and out of each of the nodes and may perform filtering and compile metadata about the traffic while performing message and volume filtering.

In this example security system, the robustness modules 210 may operate independently, but may communicate with each other to, for example, instruct each other to disconnect their respective device from the network if their device is sending a lot of suspect messages, as determined by a volume filter, or to provide discarded message logs to one another or to a user interface module 211 (illustrated as being in the user interface devices 230). Still further, a user may use a user interface module 211 to configure one or more of the robustness modules 210, and a user may need have a proper security ID or security permissions to do so. Of course, the user interface module 211 may communicate over one or more network links 200, and the user interface module 211 may be installed in any of the other computer devices on the network 114, such as in the configuration database 232, the gateway devices 226, 228, the switches 202, etc. on the network. Additionally, communications (such as alerts and discard logs) from the sub-network devices, such as the field devices 215-222, I/O devices 236, 238 and wireless field devices 240-258, may be sent up to a primary network node device, such as the controller 260 or the gateway device 235, and these devices may then forward those communications to the user interface module 211 or other robustness modules 210. Still further, as illustrated in FIG. 3, the configuration database 232 includes a configuration change module 370 which may detect configuration changes in the network and which may communicate robustness module rule sets based on these configuration changes to the robustness modules 210 in any desired manner. As is illustrated in at least some of the nodes of FIG. 3, each of the node devices includes a processor 309, which may be a micro-processor, an ASIC, or other processor that implements and executes the various robustness modules 210, and includes a computer readable memory 311 that stores these modules for execution on the processor 309.

In a general sense, the message analysis rules stored in the rules memory 42 of the robustness modules 210 reflect the expected or normal behavior of the message traffic into and out of the nodes of the network 114. More particularly, the rules stored in the rules databases 42 may be generated by collecting and analyzing message or traffic metadata from the nodes of the network 114 during a particular period of time, such when the network is up and running but right after it has been set up, when there is relative certainty that the network is not compromised. During this time, the generated or collected message traffic data reflects the "normal" or "expected" operation of the network, in a statistical sense. Various traffic pattern parameters or statistics can be collected or generated from the message traffic data collected during this time and this data may be stored in a traffic pattern database for use in creating one or more sets of rules for the various robustness modules 210. The traffic pattern parameters collected or generated and stored in the database may include, for example, statistical measures of the traffic at any particular node or groups of nodes in any granularity. That is, the stored traffic pattern parameters may indicate any statistical measure of data (e.g., mean, standard deviation, average, median, count, etc.) grouped or performed on any type of data, time frame, node or group nodes, incoming or outgoing, sender receive, length, etc. and may be stored in any desired hierarchy, such as a hierarchy that reflects the configuration hierarchy of the network. The traffic pattern parameters may also include ranges or limits for any types or groups of communications into or out of a node or group of nodes which, when exceeded, will reflect or trigger a volume filter threshold, a warning message, a disconnect from the network, etc. These ranges or limits may be absolute limits, for example, in the form of a fixed number, or may be relative limits based on or related to other statistical measures, such a three times an average value, falling within the first or second standard deviation, a predetermined amount above or below a median or mean value, etc.

As will be understood, the rules within the rules database 42 are created and are used to define the manner in which the current or collected messages should be analyzed to detect anomalies or intrusions in the network. More particularly, the rules in the rules database 42 specify the manner in which the collected message traffic should be analyzed, for example, by comparing the collected metadata or statistics about the collected messages to traffic pattern data and/or using traffic pattern limits or ranges. In a general sense, the filter modules 20, 22, 30, 32 of FIG. 1 implement the rules stored in the rules database 42 to compare the collected message data or metadata to known, desired, or expected traffic pattern parameters.

Likewise, as indicated in FIG. 1, the robustness module 10 may include an alert generator 46 which may generate one or more alerts, alarms, or messages based on the results of the analyses performed by the modules 20, 22, 30, and 32. The alerts, alarms or messages created by the alert generator 46 may be sent to any desired personnel, such as operators, security personnel, IT personnel, etc., either via the network link or via any other communication link provided for or used for that purpose. As an example, alerts, alarms or messages may be sent to a designated person's e-mail account, to an operator or security interface that also illustrates other data about the plant, may be sent as a phone call or a text message that is delivered via private or public networks to a designated person or group of people, at any desired device, such as a mobile device, etc. Likewise, these alerts, alarms or messages may set off alarms or notifications on handheld devices, such as phones, watches, wearable devices, laptops, tablet computers, etc., of any designated person responsible for responding to and investigating potential intrusions into a network. In some cases, the alarm or alert generator 46 may operate to limit access to an infected or potentially infected node, may shut down a node, or in very critical situations, may shut down or isolate the communications network itself from other networks to limit damage being done to the plant or a subsystem in the plant by the intrusion. Of course, the alert generator 46 may include software or logic that may communicate with other devices in the network to effect such automatic operations. In some cases, the alert generator 46 may ask for authorization from a user via, for example, the user interface module 211, before taking such automatic actions in the plant network, but in other cases may perform the actions in the network prior to or simultaneously with notifying a user of an intrusion or potential intrusion. Moreover, when taking automatic actions, the alert generator 46 may communicate with the infected or potentially infected node to limit communications from (into and/or out of) that node, for example, to limit or halt particular types of messages from that node, to halt or limit the operation of particular applications at that node (which may be generating the anomalous message traffic), to halt or limit communications via certain ports of a device, etc. Thus, the alert generator 46 of one robustness module 10 or 210 may change or alter the rules of the rules memory 42 of another robustness module to help prevent the latter robustness module from sending the suspect messages over the link in the first place. Instead, or additionally, the alert generator 46 may communicate with other nodes, such as gateway nodes connected to other networks, to limit or halt messages between the network and other networks. This action may allow the critical operations (such as control operations) to occur on the network, while isolating the network from outside sources to prevent, at least temporarily, the anomalous message traffic from leaving or entering the network, which may limit data theft, may halt the virus within the network from infecting other networks, may stop further intrusions into the network via the infected node, etc. For example, the alert generator 46 may sever all communications between external business systems and the affected industrial control system network until the anomaly could be assessed by security personnel on site. Of course, the alert generator 46 may be tied into (communicatively connected to) other systems, such as security systems, to perform these functions.

The rules database 42 may store any desired set of rules that are created or generated by one or more security personnel, configuration personnel, users, operators, etc., that define analyses to be performed on the message traffic or message metadata received from the communications network node or from the communication link to determine if there is an anomaly in the message traffic or traffic patterns, and thus if an alert or alarm should be generated or other filtering should occur. The rules employed by the modules 20, 22, 30, and 32 may thus operate to compare the message data collected from a node to the standard or baseline set of data for the node to determine if there are significant differences therebetween, as defined by other traffic pattern parameters, such a limits or difference variable, etc.

It will be understood that any desired types of data may be obtained and analyzed for the messages at the robustness modules 10 and 210, and that the rules in the rules database 42 may be created for analyzing the data in any desired manner. For example, the message data may include general information about the message itself, e.g., payload type, length, sources (such as configured versus nonconfigured nodes, source ports, etc.), addresses (such as source and destination addresses and ports), scope (such as unicast, multicast, broadcast), payload type (such as TCP, UDP, other), and timing (such as time of day, relative time, rate of attempts, etc.); communications information, e.g., message timing (such as rates, times of day, sequence errors, etc.), security errors (such as failed integrity, authentication, or decryption), message content (such as size, format errors, etc.); and spurious information, e.g., rate limiting info (such as state, method, rate of limiting, etc.), and connection attempts (such as out of sequence, malformed, sweeps, etc.) Of course any other types of message data or metadata may be obtained and used as well or instead in the rules 42, and it will be understood that the list provided herein is not comprehensive.

Moreover, message data may be collected and stored based on other factors or parameters within the network or nodes, such as the roles of the sending or receiving nodes (e.g., whether these nodes are workstations, servers, gateways, controllers, I/O servers, remote terminal units (RTUs), etc.) Thus, it will be understood that message and traffic metadata may be created at or for various different hierarchical levels of the network, such as on a device or node basis, a device or node role basis, a message basis, etc., or relative to any other hierarchical level of the network. Still further, the configuration information of the control or communications network may be used to initially create or to modify rules for analyzing message metadata, or to organize the message metadata analysis. Generally speaking, the configuration information for the network includes information regarding the number of applications, modules, control routines, etc. at each of the nodes (devices) and the manner in which these various logical elements, software elements and hardware elements communicate with one another, including communication pairs (sender/receiver pairs), communication timings, frequencies, types of messages, control system role or device type, etc. This configuration information may be used to create or modify the rules that are used to analyze the messages at any of the nodes. That is, the configuration information, including the configuration hierarchy information (e.g., what devices and modules are related to what other modules and devices in the network) may be used to create modify or fill out parameters of rules for analyzing messages. As an example, the configuration information may be used to, for example, select a subset (i.e., a profile) of the generalized rules for analyzing messages. The configuration information may also be used to plug in specific values within one or more generalized rule parameters (e.g., where a rule has a placeholder for <subscribers>, the configuration information could be used to fill in the address and port information for the specific subscribers listed in the configuration). In this manner, the effective logic rules can be tailored from a larger set of general rules to a subset of specific rules based on the control system configuration of a device or node.

Still further, as illustrated in FIGS. 2 and 3, the security system may include a network configuration change module 370 that may be, for example, stored in a network configuration database or server device 122C or 232. Generally speaking, the configuration change module 370 operates to detect changes in the network configuration for the communications network and then sends these changes and/or notifications of these changes to the user interface module 211 via, for example, the network link. As used herein, a configuration change may include any change made to the operation of a device or set of devices on the network, including the addition of new devices, applications, modules, etc.; the removal of any devices, applications, modules, etc.; and the change in device, application, module, etc., parameters, settings or other configurations, (including changing of any hardware, software or firmware setting), including changing communication and process control settings, such as, for example, changing a recipe used in, for example, a batch process, etc. In this case, whenever a configuration engineer or other user changes the network configuration by, for example, adding new applications or modules to the network, changing the manner in which applications or modules in the network communicate with one another, etc., the network configuration change module 370 detects such a change and sends a notification to the user interface module 211 informing the user of the change in the network configuration. Of course, while the change module 370 is illustrated as being located in the configuration database (e.g., the database 232 of FIG. 3), the configuration module 370 can be located in any device or computer (such as an operator interface device or a server) that has access to or that implements a configuration application (that changes or enables a user to change the configuration of the network) or that otherwise is notified of configuration changes, and may operate in any desired manner to detect network configuration changes.

In any event, whenever a change is made to the configuration of the network (e.g., effecting the addition, deletion or changing of communication aspects of any software, function blocks, modules, etc., in any of the devices on the network or tied to the network), the change detection module 370 may send a notification to the user interface module 211 to inform the user to expect changes or potential changes in network traffic patterns or specifics. This notification may enable the user to create new rules or alter rules already in one or more of the robustness modules 210 to thereby better configure the robustness modules 210 in light of the new network configuration.

Thus, as will be understood, a change in the network configuration may change the network message flow by, for example, increasing or decreasing network messages of certain types, changing specific types of network communications (e.g., by changing the properties of or amounts of certain types of communications between various devices on the network or between applications run within the various devices at the nodes of network). In some circumstances, it may be desirable to change, add or delete rules in the rules database 42 of one or more robustness modules 210 as a result of the new configuration to, for example, tailor the rules to the new configuration, such as by implementing a profile plug-in within one or more rules of the rule database to match or reflect parameters of the new configuration. For example, new types of communications may be added by the new configuration and a rule may be updated with a profile plug-in based on the new communication, and this rule may then be used to analyze the messages associated with these new types of communications.

Moreover, while the security system described herein is illustrated as having separate syntax and volume filters, a single filter could perform the functions described for each of these different filters. For example, a single filtering module could be executed on a processor of a network device to use the logic rules store in the rules memory of the device to pass messages with one or more first sets of message characteristics, to halt messages with one or more second sets of message characteristics, and to count messages with one or more third sets of message characteristics, and could further operate to pass or halt the messages with the one or more third set of message characteristics based on the counts associated with the one or more third sets of message characteristics.

While the security techniques described herein have been described as being used in conjunction with networked process control devices and systems using Ethernet and various known process control protocols, such as Fieldbus, HART and standard 4-20 ma protocols, the security techniques described herein can, of course, be implemented in any type of control device using any other process control communication protocol or programming environment and may be used with any other types of devices, function blocks or controllers. Although the security features described herein are preferably implemented in software, they may be implemented in hardware, firmware, etc., and may be executed by any other processor associated with a computer device. Thus, the methods and routines and systems described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc.

Moreover, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A security system for use in a communications network having a plurality of network nodes of a process control system communicatively coupled via a communications link, wherein at least one network node of the plurality of network nodes controls operation of a field device within the process control system, the security system comprising:

one or more message module interfaces, wherein each of the message module interfaces executes on a processor at one of the network nodes to detect message traffic at the network node from other network nodes of the plurality of network nodes and to determine one or more message characteristics of each of the messages;
a rules memory that stores one or more logic rules; and
one or more filtering units stored in and executed on a processor and coupled to the rules memory, each of the filtering units including;
a syntax filtering module, and
a volume filtering module,
wherein the syntax filtering module executes on the processor and applies one or more logic rules stored in the rules memory based on the message characteristic information to pass the message, to halt the message, or to pass the message to the volume filtering module;
wherein the volume filtering module counts the number of messages having a particular set of message characteristics to determine a message count and halts the message having the particular set of message characteristics based on the message count exceeding a predetermined threshold stored in the rules memory.

2. The security system of claim 1, wherein the message count comprises a particular number of messages with the particular set of message characteristics received within a particular time period.

3. The security system of claim 1, wherein the rules memory is a read-only memory.

4. The security system of claim 1, wherein the rules memory is a read/write memory.

5. The security system of claim 1 wherein the rules memory includes a first portion that is a read-only memory and includes a second portion that is a read/write memory.

6. The security system of claim 1, wherein the rules memory is a flash memory.

7. The security system of claim 6, wherein the rules memory is a removable flash memory.

8. The security system of claim 1, further including a logging module coupled to the syntax or the volume filtering modules, which executes on the processor, to receive information regarding one or more halted messages and to store information regarding the one or more halted messages.

9. The security system of claim 8, wherein the logging module further includes a communications interface that sends one more logs of halted messages to a user.

10. The security system of claim 8, wherein the logging module stores metadata regarding the halted messages.

11. The security system of claim 1, further including an alert generation module that is coupled to the volume filtering module, wherein the alert generation module executes on the processor to send an alert to a user when the message count reaches a predetermined level.

12. The security system of claim 1, further including an alert generation module that is coupled to the volume filtering module, wherein the alert generation module executes on the processor to disconnect a device from the communications network when the message count reaches a predetermined level.

13. The security system of claim 1, wherein the one or more filtering units includes a first filtering unit that receives and analyzes messages coming into the network node from the communications link and a second filtering unit that receives and analyzes messages generated in the network node and being sent to another network node via the communications link.

14. A method of securing message traffic in a communications network of a process control system, comprising:

receiving a series of messages at a device connected to the communications network, the series of messages being generated by one or more other devices of the process control system, wherein at least one device of the one or more other devices controls operation of a field device within the process control system;
analyzing, via a processor at the device, each of the series of messages to determine one or more message characteristics of each of the messages; and
filtering each of the messages, via the processor at the device, based on a set of logic rules stored at the device, the filtering including passing messages with one or more first sets of message characteristics, halting messages with one or more second sets of message characteristics, and counting messages with one or more third sets of message characteristics, and further including halting the messages with the one or more third sets of message characteristics based on counts associated with the one or more third sets of message characteristics exceeding predetermined thresholds.

15. The method of claim 14, wherein counting messages with one or more third sets of message characteristics includes counting the number of messages having one of the third sets of message characteristics received within a particular time period.

16. The method of claim 14, wherein counting messages with one or more third sets of message characteristics includes keeping a count of the number of messages of each of the third sets of message characteristics received within a particular time period.

17. The method of claim 14, wherein counting messages with one or more third sets of message characteristics includes keeping a count of the number of messages of each of the third sets of message characteristics.

18. The method of claim 14, further including storing the logic rules in a read-only memory in the device.

19. The method of claim 14, further including storing the logic rules in a read/write memory in the device.

20. The method of claim 14, further including storing a first portion of the logic rules in a read-only memory and storing a second portion of the logic rules in a read/write memory.

21. The method of claim 14, further including storing at least of portion of the logic rules in a flash memory at the device.

22. The method of claim 14, further including logging information regarding one or more halted messages to create on or more log files.

23. The method of claim 22, further including communicating the one or more log files with the logging information to a user via the communications network.

24. The method of claim 22, wherein logging information includes storing metadata regarding the halted messages in a memory at the device.

25. The method of claim 14, further including generating an alert to send to a user when a message count of messages with one of the one or more third set of message characteristics reaches a predetermined level.

26. The method of claim 14, further including initiating a security action when a message count of messages with one of the one or more third set of message characteristics reaches a predetermined level.

27. The method of claim 26, wherein initiating the security action includes initiating virus or intrusion detection software in a device on the communications network.

28. The method of claim 26, wherein initiating the security action includes disconnecting a device from a communications link of the communications network.

29. The method of claim 26, wherein initiating the security action includes disconnecting a different device on the communications network from the communications link of the communications network.

30. The method of claim 14, wherein passing the messages with the one or more first sets of message characteristics and passing the messages with the one or more third set of message characteristics includes passing the messages to a communications stack of the device for processing at the device.

31. The method of claim 14, wherein passing the messages with the one or more first sets of message characteristics and passing the messages with the one or more third set of message characteristics includes passing the messages to a communications link of the communications network for transmission to another device on the communications network.

32. The method of claim 14, wherein receiving the series of messages at a device connected to the communications network includes receiving a first series of messages generated within the device and receiving a second series of messages received from a communications link of the communications network, wherein analyzing each of the series of messages includes analyzing each of the first series of messages and the second series of messages separately, and wherein filtering each of the messages includes filtering each of the first series of messages and the second series of messages separately.

33. The method of claim 32, wherein filtering each of the first series of messages and the second series of messages separately includes filtering the first series of messages using a first set of logic rules and filtering the second series of messages using a second and different set of logic rules.

34. A communications network, comprising:
a communications link;
a plurality of network nodes of a process control system, each of the network nodes including a network device coupled to the communications link and having a processor and a communications stack that executes on the processor to process messages coming from and going to the communications link, and at least one of the plurality of network nodes controls operation of a field device within the process control system;
wherein each of the plurality of the network nodes further includes,
one or more message module interfaces, wherein each of the message module interfaces executes on a processor at a network node to detect message traffic coming from the communications stack or from the communications link to determine one or more message characteristics of each of the messages;
a rules memory that stores one or more logic rules; and
a filtering module stored in and executed on a processor and coupled to the rules memory, that uses the set of logic rules stored in the rules memory to pass messages with one or more first sets of message characteristics, to halt messages with one or more second sets of message characteristics, and to count messages with one or more third sets of message characteristics, and that further halts the messages with the one or more third sets of message characteristics based on counts associated with the one or more third sets of message characteristics exceeding predetermined thresholds stored in the rules memory.

35. The communications network of claim 34, wherein the filtering module produces the message counts for the messages with the one or more third sets of message characteristics as a number of messages with a particular set of message characteristics received within a particular time period.

36. The communications network of claim 34, wherein the rules memory is a read-only memory.

37. The communications network of claim 34, wherein the rules memory is a read/write memory.

38. The communications network of claim 34, wherein the rules memory includes a first portion that is a read-only memory and includes a second portion that is a read/write memory.

39. The communications network of claim 34, wherein each of the plurality of network nodes further includes a logging module coupled to the filtering module, wherein the logging module executes on the processor to receive information regarding one or more halted messages and to store information regarding the one or more halted messages in one or more logs.

40. The communications network of claim 39, wherein the logging module further includes a communication interface that sends the one or more logs of halted messages to a user.

41. The communications network of claim 40, wherein the logging module stores metadata regarding the halted messages.

42. The communications network of claim 34, wherein each of the plurality of network nodes further includes an alert generation module that is coupled to the filtering module, wherein the alert generation module executes on the processor to send an alert to a user when one of the message counts reaches a predetermined level.

43. The communications network of claim 34, wherein each of the plurality of network nodes further includes an alert generation module that is coupled to the filtering module, wherein the alert generation module executes on the processor to disconnect a device from the communications link network when one of the message counts reaches a predetermined level.

44. The communications network of claim 34, wherein each of the plurality of network nodes includes two or more filtering modules, wherein a first one of the two or more filtering modules receives and analyzes incoming messages into the network device at the network node from the communications link and a second one of the two or more filtering modules that receives and analyzes messages generated in the network device at the network node and being sent to another network device at another network node via the communications link.

* * * * *

UNITED STATES PATENT AND TRADEMARK OFFICE
CERTIFICATE OF CORRECTION

PATENT NO. : 11,363,035 B2
APPLICATION NO. : 14/719946
DATED : June 14, 2022
INVENTOR(S) : Vinaya S. Rayapeta et al.

Page 1 of 2

It is certified that error appears in the above-identified patent and that said Letters Patent is hereby corrected as shown below:

In the Specification

At Column 2, Line 46, "well" should be -- well as --.

At Column 7, Line 1, "rule" should be -- rules --.

At Column 7, Line 32, "DESCRIPTION" should be -- DETAILED DESCRIPTION --.

At Column 9, Line 13, "to" should be -- too --.

At Column 10, Line 36, "provide" should be -- provided --.

At Column 12, Line 64, "etc.)" should be -- etc. --.

At Column 12, Line 66, "on-the fly" should be -- on-the-fly --.

At Column 13, Line 4, "can" should be -- can be --.

At Columns 13 & 14, in Table 1, Line 29, "a" should be -- in a --.

At Columns 13 & 14, in Table 1, Line 30, "separate the" should be -- separate --.

At Column 16, Line 57, "a" should be -- as --.

At Column 19, Line 33, "(ROM)" should be -- (ROM). --.

At Column 20, Line 36, "by the" should be -- by --.

Signed and Sealed this
Sixteenth Day of December, 2025

John A. Squires
*Director of the United States Patent and Trademark Office*

CERTIFICATE OF CORRECTION (continued)
U.S. Pat. No. 11,363,035 B2

At Column 21, Line 52, "to," should be -- too, --.

At Column 21, Line 59, "need" should be -- need to --.

At Column 22, Line 26, "such" should be -- such as --.

At Column 22, Line 54, "a" should be -- as --.

At Column 26, Line 16, "store" should be -- stored --.

In the Claims

At Column 28, Line 50, "on or more" should be -- one or more --.